J. B. RICKARDS & W. H. GEIGER.
GASOLENE STRAINER.
APPLICATION FILED JUNE 15, 1910.
973,305.
Patented Oct. 18, 1910.
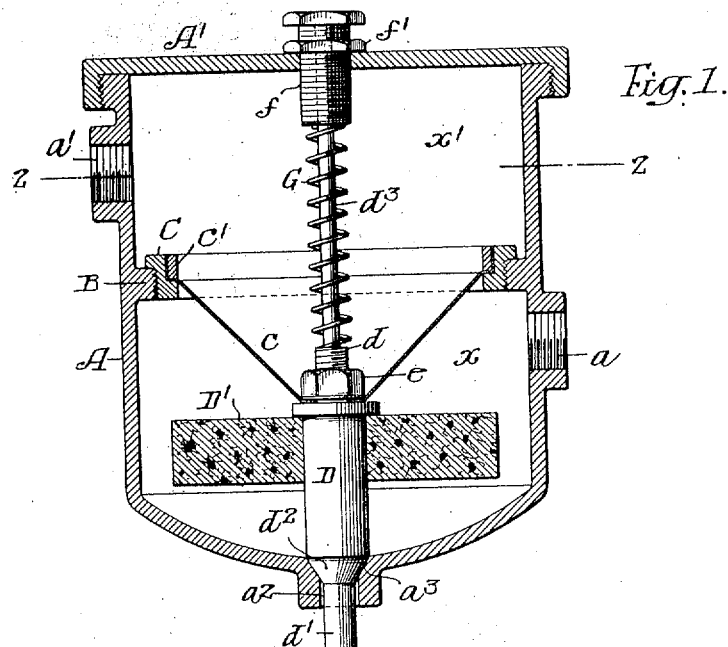
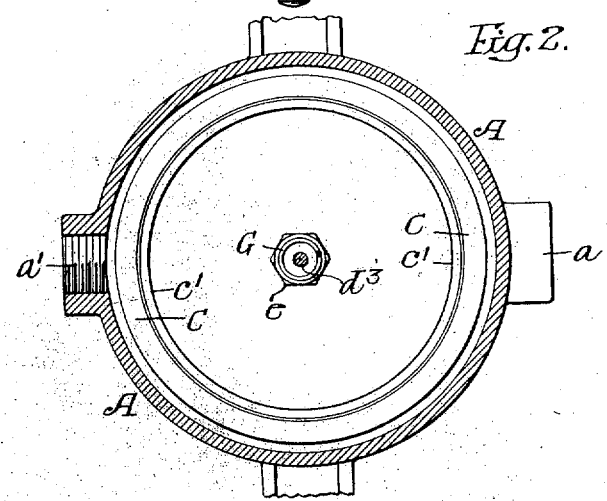
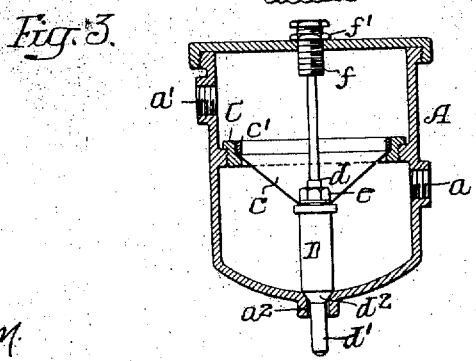
Witnesses:
Walter Chism
Wilk H. Burrowes
Inventors:
Joshua B. Rickards
Walter H. Geiger
by their Attorneys
Howson & Howson

UNITED STATES PATENT OFFICE.

JOSHUA B. RICKARDS AND WALTER H. GEIGER, OF PHILADELPHIA, PENNSYLVANIA.

GASOLENE-STRAINER.

973,505.

Specification of Letters Patent. Patented Oct. 18, 1910.

Application filed June 15, 1910. Serial No. 567,077.

*To all whom it may concern:*

Be it known that we, JOSHUA B. RICKARDS and WALTER H. GEIGER, citizens of the United States, residing in Philadelphia, Pennsylvania, have invented certain Improvements in Gasolene-Strainers, of which the following is a specification.

Our invention relates to certain improvements in means for straining and purifying gasolene as it passes from the tank or reservoir to the engine.

The invention is particularly adapted for use on automobiles or motor boats using gasolene as the fuel.

The object of the present invention is to provide a strainer which will separate the water and dirt from the gasolene and which will automatically discharge the water.

In the accompanying drawing:—Figure 1, is a vertical section of our improved gasolene strainer; Fig. 2, is a sectional plan view on the line 2—2, Fig. 1; and Fig. 3, is a view illustrating a modification of the invention.

A is the casing of the strainer having a cap A' which is attached to the casing in any suitable manner. In the present instance the casing is threaded and the cap has an internal screw thread adapted to the thread of the casing. Within the casing is a partition B having an opening; the walls of the opening being threaded in the present instance, and mounted in this opening is a threaded ring C to which is attached the straining medium $c$, which in the present instance is chamois. This chamois is held to the ring C by a smaller ring $c'$ fitting in the recess in the ring C. The chamois disk $c$ is perforated at the center and is attached to the valve D by a nut $e$ which is adapted to the threaded stem $d$ of the valve.

$a$ is the inlet to the casing and $a'$ is the outlet. The inlet $a$ communicates with the compartment $x$ under the partition B and the outlet $a'$ communicates with the compartment $x'$ above the partition.

The valve D has a stem $d'$ below the beveled portion $d^2$, and this stem extends through a water discharge opening $a^2$ in the bottom of the casing A and the opening is flared to form a seat $a^3$ for the valve D. Extending from the upper end of the valve is a rod $d^3$ arranged to slide in a bearing $f$ mounted in the cap A'. This bearing has a threaded periphery adapted to the threaded opening in the cap and is held in place by a jam nut $f'$. Between the end of the stem $d$ of the valve and the bearing $f$ is a spring G, and by adjusting the bearing $f$ more or less tension can be placed upon the spring.

Secured to the body of the valve D and mounted within the compartment $x$ is a float D', which, in the present instance, is made of cork, but it may be made of any suitable material without departing from the essential features of the invention.

When the device is applied to an automobile for instance, the pipe leading from the gasolene tank is connected to the casing A at the inlet $a$, so that the gasolene will flow under the filtering diaphragm $c$. The pipe leading to the engine is connected to the casing at the outlet $a'$ and communicates with the compartment $x'$. The gasolene will pass freely through the chamois diaphragm $c$, while water will not pass through but will be collected in the bottom of the compartment $x$ and any dirt or other matter entering the compartment $x$ cannot pass through the diaphragm and must settle in the bottom of said compartment, so that the gasolene passing from the compartment $x'$ will be strained and purified.

As the water accumulates in the compartment $x$ it will eventually lift the float D', and as this float is connected to the valve D it will raise it sufficiently to allow the water to flow through the outlet openings $a^2$ to waste. As soon as the water escapes the valve will again close the opening until the water lifts the valve off its seat, so that the device is entirely automatic.

In some instances we may dispense with the float D', as illustrated in Fig. 3. In this instance the water lifts the valve by contacting with the diaphragm $c$, the weight of the valve returning it to its seat as soon as a certain quantity of water escapes, but we prefer to use the construction illustrated in Fig. 1, as the spring G can be so regulated as to hold the valve to its seat against any jumping of the valve due to the vibrations of the mechanism, while the float will act before the water reaches the diaphragm.

We claim:—

1. The combination in a strainer for gasolene or other liquids, of a casing, a partition dividing the casing into two compartments, said partition having an opening, a filtering diaphragm within the opening, a valve connected to the diaphragm, an inlet for the gasolene or other liquid on one side of the diaphragm, and an outlet on the other side of the diaphragm.

2. The combination in a strainer for gasolene and other liquids, of a casing, a partition dividing the casing into two compartments, said partition having an opening, a chamois diaphragm mounted in the opening, said casing having an opening in the bottom, a valve arranged to close said opening, said valve being attached to the chamois diaphragm, the casing having an inlet opening below the partition and an outlet opening above the partition.

3. The combination in a casing, of a transverse partition, said partition having an opening therein, a diaphragm mounted within said opening, the casing having an outlet opening at the bottom, a valve secured to the diaphragm and arranged to close the opening in the bottom of the casing, a float carried by the valve, the casing having an inlet opening communicating with the compartment under the partition and an outlet opening communicating with the compartment above the partition.

4. The combination in a casing, a partition dividing the casing into two compartments, a cap closing the upper compartment, said casing having an opening in the bottom for the escape of water, a ring secured within an opening in the partition, a diaphragm secured to the ring, a valve arranged to close the opening in the bottom of the casing and secured to the diaphragm, an extension on the valve, a threaded bearing in the cap for the said extension, a spring mounted between the bearing and the valve, the casing having an inlet opening below the diaphragm and an outlet opening above the diaphragm.

5. The combination in a casing, of a partition dividing the casing into two compartments, a cap closing the upper compartment, said casing having an opening in the bottom for the escape of water, a ring secured within an opening in the partition, a diaphragm secured to the ring, a valve arranged to close the opening in the bottom of the casing and secured to the diaphragm, an extension on the valve, a threaded bearing in the cap for the said extension, a spring mounted between the bearing and the valve, a float on the valve, the casing having an inlet opening below the diaphragm and an outlet opening above the diaphragm.

In testimony whereof, we have signed our names to this specification, in the presence of two subscribing witnesses.

JOSHUA B. RICKARDS.
WALTER H. GEIGER.

Witnesses:
Wm. E. Shupe,
Wm. A. Barr.